United States Patent [19]

Senft et al.

[11] Patent Number: 4,621,538
[45] Date of Patent: Nov. 11, 1986

[54] FOOT-OPERATED PARKING BRAKE

[75] Inventors: Ernst Senft, Möglingen; Hans Hirth, Würzburg; Herbert Klemmer, Nürtingen, all of Fed. Rep. of Germany

[73] Assignee: Daimler-Benz Aktiengesellschaft, Fed. Rep. of Germany

[21] Appl. No.: 720,184

[22] Filed: Apr. 5, 1985

[30] Foreign Application Priority Data

Apr. 6, 1984 [DE] Fed. Rep. of Germany ....... 3413030

[51] Int. Cl.⁴ .............................................. G05G 1/14
[52] U.S. Cl. ....................................... 74/512; 74/542
[58] Field of Search ............. 74/492, 512, 529, 540, 74/541, 542; 180/271, 274, 275, 277, 280; 280/777

[56] References Cited

U.S. PATENT DOCUMENTS

| 2,932,981 | 4/1960 | Roesch | 74/541 |
| 3,511,107 | 5/1970 | Yasiro | 74/512 |
| 3,974,713 | 8/1976 | Toohey | 74/512 |

FOREIGN PATENT DOCUMENTS 7113766  4/1971  Fed. Rep. of Germany.

Primary Examiner—Albert J. Makay
Assistant Examiner—Steven E. Warner
Attorney, Agent, or Firm—Barnes & Thornburg

[57] ABSTRACT

The application relates to a lockable and releasable pedal mounting arrangement for a foot-operated parking brake of a motor vehicle, which mounting is fastened to a cowl column in the driver's foot space in the junction region of a dashboard cowl and pivotable out of the foot space about a pedal pivot under the effect of a rearward deformation of the cowl as the result of an accident so that there is little adverse effect on the inner safety of the vehicle.

4 Claims, 7 Drawing Figures

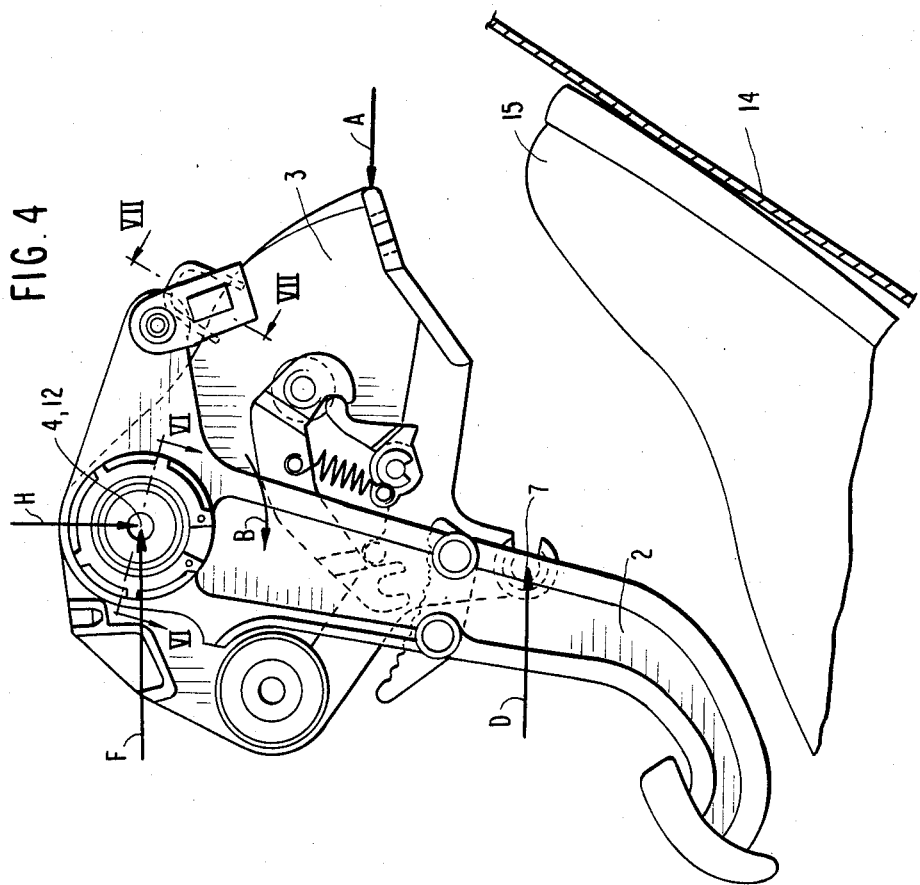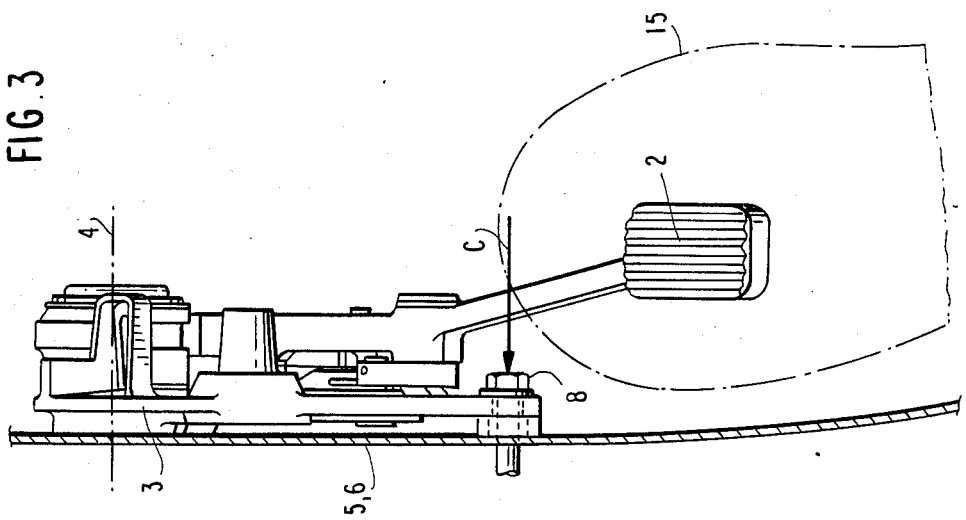

FOOT-OPERATED PARKING BRAKE

The invention relates to a lockable and releasable pedal mounting arrangement for a foot-operated parking brake in a motor vehicle, which mounting, in the junction region of a dashboard cowl, is fastened to a cowl column in the driver's foot space.

Known foot-operated parking brakes of this type have a housing which is secured to the front cowl of the vehicle and to an instrument panel and/or a front column of the vehicle. In the event of an accident there is a danger that intrusion of the cowl will give rise to substantial deformations or even destruction of the instrument panel and the front column along with the housing, since this housing is generally relatively rigid in the longitudinal direction of the vehicle and can consequently transmit high intrusion forces.

The object on which the present invention is based was to fasten a foot-operated parking brake which does not transmit high intrusion forces upon the brake pedal when there are substantial deformations or destruction of the instrument or front panel of the vehicle so there is no fear of any adverse effects caused by the brake pedal in the event of an accident.

This object is achieved, according to the invention, by a pedal mounting arrangement, pivotable about a pedal pivot out of the driver's foot space upon a rearward deformation of the cowl as the result of an accident.

A further object of the invention is to have a foot-operated parking brake housing frictionally mounted to a cowl column of a vehicle by means of a baseplate pivotally and releasably mounted thereto so as to permit pivoting of the brake pedal out of the driver's foot space upon deformation of the cowl column caused by an accident.

This object is achieved by a bore in the baseplate opening in a direction counter to the pivoting direction of the brake and by a frictional securing member consisting of a lug with elastic covering cooperating with a stay which opens in the pivoting direction.

These and other objects, features, and advantages of the present invention will become more apparent from the following description when taken in connection with the accompanying drawings which show, for the purposes of illustration only, one embodiment in accordance with the present invention, and wherein:

FIG. 3 shows, on a larger scale, a view of the foot-operated parking brake, as seen in the driving direction;

FIG. 4 shows a corresponding view in the transverse direction of the vehicle;

Figure 1:
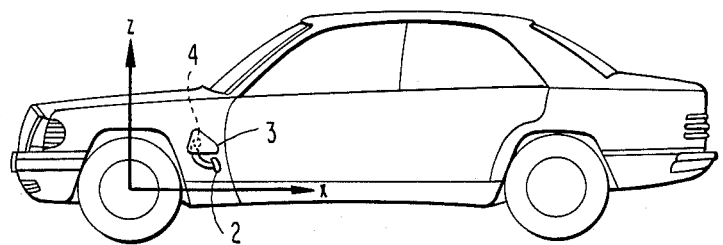
FIG. 1 shows a diagrammatic side view of a passenger car equipped with a foot-operated parking brake, to illustrate the axial directions mentioned in the following description.
Figure 2:
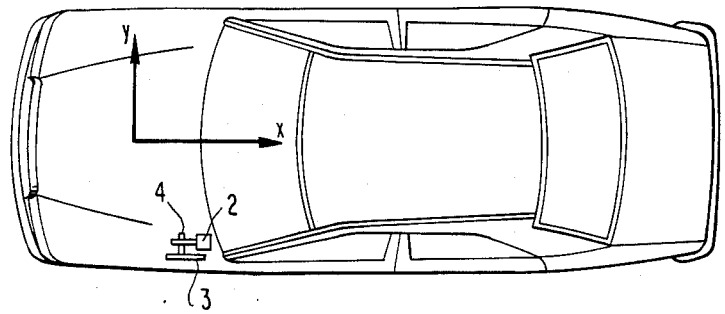
FIG. 2 shows a plan view of the representation according to FIG. 1.
Figure 5:
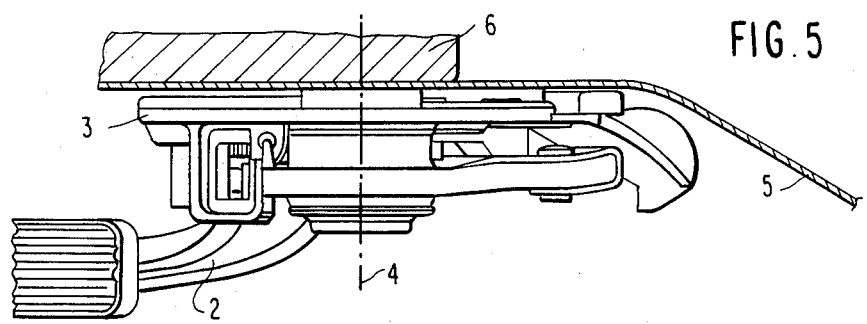
FIG. 5 shows a plan view of the foot-operated parking brake according to FIGS. 3 and 4.
Figure 6:
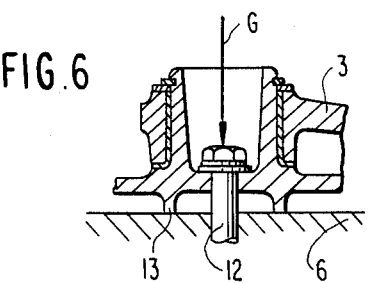
FIG. 6 shows a section along the line VI—VI in FIG. 4.
Figure 7:
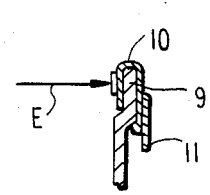
FIG. 7 shows a section along the line VII—VII in FIG. 4.

Referring now to the drawings wherein like reference numerals are used to designate like parts and more particularly to FIG. 1 there is shown a pedal arrangement wherein a pedal 2 is mounted on a baseplate 3 so as to be rotatable about a pivot 4. The pedal 2 is at the same time connected in a conventional manner, not explained in any more detail here, to the brakes to be applied and is arranged so that it can be locked in selected positions relative to the baseplate 3 and released again by hand.

Referring to FIGS. 3 and 4, the baseplate 3 is connected to the front column 6 or the cowl 5 of the vehicle at three points. Two connection points are designed so that the connection is broken in the event of an appropriately high impact stress, caused by an accident and exerted in the direction of the arrow A, while the third connection remains intact allowing the entire pedal arrangement 1 to pivot in the direction of the arrow B.

A first connection point on the column 6 is designed as a bore 7 which is open counter to the pivoting direction B and which is intended for receiving a screw 8 disengaging when the baseplate 3 pivots as the result of an accident. As regards this first connection point, the arrow C symbolizes a blocking of rotation about the X-axis and the arrow D a blocking of rotation about the Y-axis in the operating state.

The second connection point on the cowl 5, releasable in the event of an accident, is designed as a lug 9 projecting from the baseplate 3, having an elastic covering 10 and interacting with a stay 11, integral with the vehicle and open in the pivoting direction. Here, the arrow E symbolizes a blocking of rotation about the Z-axis, and the further degrees of freedom of the lug 9 serve here for compensating bodywork tolerances.

Finally, the third connection point about which the pedal arrangement can pivot in the event of a collision is formed by a screw connection 12, by means of which the pedal arrangement is secured to the column 6. Here, a frictional force dependent on the tightening torque of the screw, inter alia, arises between a shoulder 13 projecting in the form of a collar from the baseplate 3 and the outer surface of the column 6. The arrows F, G, and H symbolize supporting forces in the directions X, Y and Z.

The pedal arrangement pivots in the direction of the arrow B, because a foot rest 14 for the driver's foot 15 is often arranged in the region between the pedal 2 and the cowl, so that in the event of an accident, the pedal 2 is necessarily pivoted away from the foot 15 to avoid injury.

While we have shown and described only one embodiment in accordance with the present invention, it is understood that the same is not limited thereto but is suceptible to numerous changes and modifications as known to one having ordinary skill in the art, and we therefore do not wish to be limited to the details shown and described herein, but intend to cover all such modifications as are encompassed by the scope of the appended claims.

We claim:

1. A lockable and releasable pedal arrangement for a foot-operated parking brake of a motor vehicle fastened to a cowl column in the driver's foot space in the junction region of a dashboard cowl, characterized in that the pedal arrangement is pivotably mounted on a baseplate which is fastened to the vehicle at three points and out of a driver's foot space under the effect of a rearward deformation of the cowl as the result of an accident and wherein the baseplate is frictionally mounted at the pivot axis of the pedal to a component integral with the vehicle in such a way that the pedal and baseplate pivot against a frictional force acting between the baseplate and the component integral with the vehicle.

2. A lockable and releasable pedal arrangement for a foot-operated parking brake of a motor vehicle fastened to a cowl column in the driver's foot space in the junction region of a dashboard cowl, characterized in that the pedal arrangement is pivotably mounted on a baseplate which is fastened to the vehicle at three points and out of a driver's foot space under the effect of a rearward deformation of the cowl as the result of an accident and wherein for the mounting to be releasable as the result of an accident, it has a component integral with the vehicle cooperating with a bore in the baseplate which bore has an opening counter to the pivoting direction of the pedal arrangement.

3. A lockable and releasable pedal arrangement for a foot-operated parking brake of a motor vehicle fastened to a cowl column in the driver's foot space in the junction region of a dashboard cowl, characterized in that the pedal arrangement is pivotably mounted on a baseplate which is fastened to the vehicle at three points and out of a driver's foot space under the effect of a rearward deformation of the cowl as the result of an accident and wherein the baseplate is secured against rotation about a vertical axis by a projecting lug interacting with a stay, integral with the vehicle and open in the pivoting direction.

4. A lockable and releasable pedal arrangement according to claim 3, characterized in that the lug has a covering consisting of elastically flexible material.

* * * * *